United States Patent [19]

Doremus et al.

[11] Patent Number: 4,658,904

[45] Date of Patent: Apr. 21, 1987

[54] SUBSEA MASTER VALVE FOR USE IN WELL TESTING

[75] Inventors: Bernard Doremus, Echouboulains, France; Dale E. Meek, Missouri City, Tex.

[73] Assignee: Schlumberger Technology Corporation, Houston, Tex.

[21] Appl. No.: 740,085

[22] Filed: May 31, 1985

[51] Int. Cl.⁴ .................. F21B 34/04; F21B 34/10
[52] U.S. Cl. .................. 166/336; 166/319; 166/374; 137/614.19
[58] Field of Search .......... 166/336, 338, 319, 320, 166/321, 322, 324, 332, 374, 375, 373, 386; 251/51, 58, 62; 137/613, 614.11, 614.19

[56] References Cited

U.S. PATENT DOCUMENTS

| | | | |
|---|---|---|---|
| 3,967,647 | 7/1976 | Young | 166/54.5 X |
| 4,009,753 | 3/1977 | McGill et al. | 251/58 X |
| 4,253,525 | 3/1981 | Young | 166/336 |
| 4,256,282 | 3/1981 | Goldschild et al. | 137/614.11 X |
| 4,399,870 | 8/1983 | Baugh et al. | 166/319 X |
| 4,415,027 | 11/1983 | Russell | 166/321 X |
| 4,494,609 | 1/1985 | Schwendemann | 166/336 |

Primary Examiner—Stephen J. Novosad
Assistant Examiner—David J. Bagnell

[57] ABSTRACT

In accordance with illustrative embodiments of the present invention, a new and improved subsea test tree includes a hydraulically operable control unit and shut-in valve unit that are releasably latched together. The control unit includes an integral retainer valve system at the upper end thereof. The main shut-in valve, which is a ball valve, is a fail-close device under the influence of a spring and nitrogen pressure. Additional assistance in closing the valve may be provided if needed by hydraulic pressure applied to a surface control line. Internal pressure may be vented prior to unlatching the control unit in case of an emergency.

9 Claims, 12 Drawing Figures

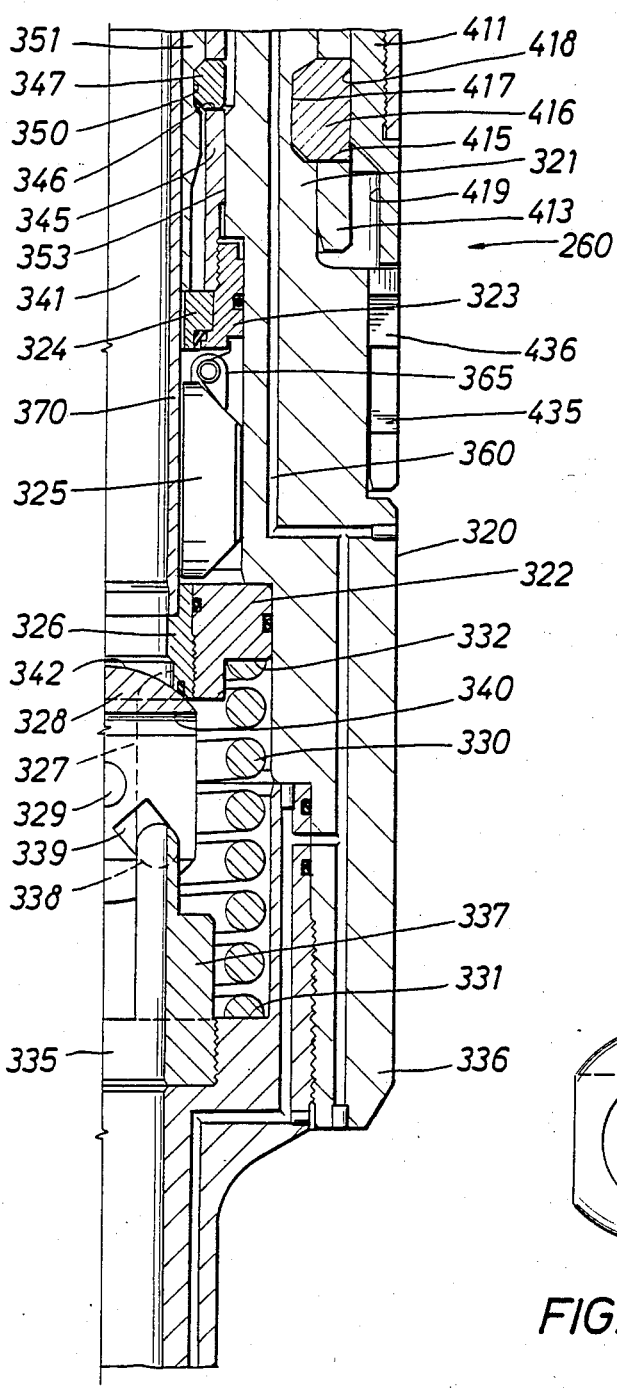
FIG.5C
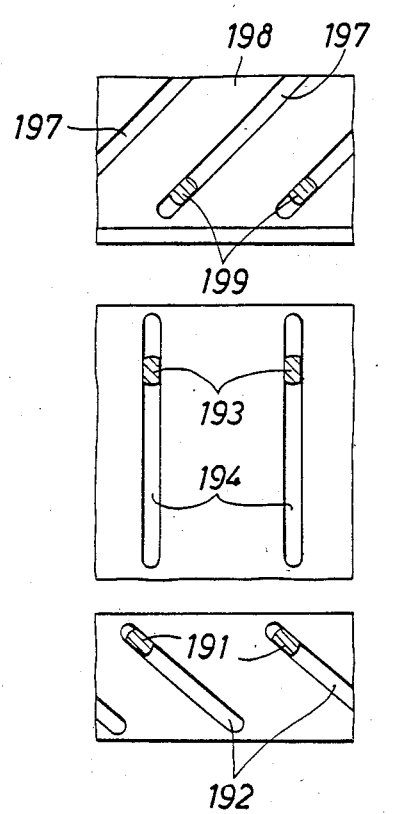
FIG.6
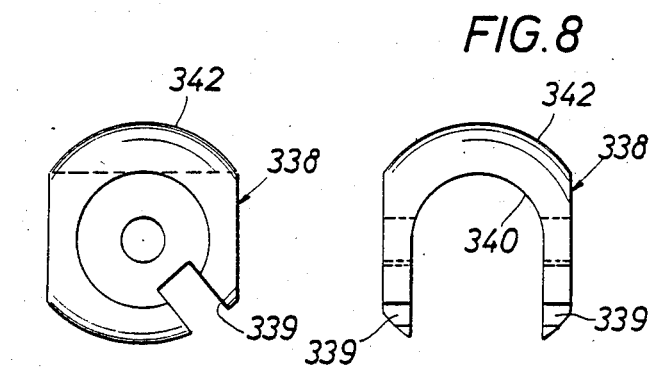
FIG.8
FIG.7
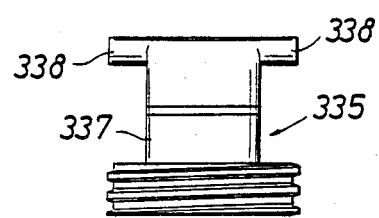
FIG.9

SUBSEA MASTER VALVE FOR USE IN WELL TESTING

FIELD OF THE INVENTION

This invention relates generally to a control valve apparatus that is positioned within a subsea blowout preventer stack during production testing of an offshore well, and particularly to a new and improved control valve apparatus that has remotely operable, redundant shut-in valves mounted in a short-length valve body, and a retainer valve that is incorporated as an integral part of a control unit that is releasably latched to the valve body.

BACKGROUND OF THE INVENTION

To conduct a production test of an offshore well from a floating vessel, it has become conventional practice to employ a subsea master valve apparatus, or "test tree", that includes a relatively short-length valve body which is releasably latched to a hydraulically operable control unit. The apparatus is positioned and landed in a subsea blowout preventer stack that is located on the sea floor. The master valve section is connected to a production string of pipe that extends downwardly into a well, and the control unit is connected to a length of production pipe that extends upwardly within a riser to the floating vessel. Examples of related devices of this general type are shown in U.S. Pat. Nos. 3,967,647 and 3,955,623, assigned to the assignee of this invention. These devices have the significant advantage over other systems, shown for example in U.S. Pat. No. RE 27,464, that the hydraulic control unit can be disconnected from the valve body in case of an emergency, and removed with the pipe from the riser, leaving the valve body in place. The valve body houses upper and lower valve elements to provide redundant shut-in valves, with the upper valve being a normally closed flapper element and the lower valve being a normally closed ball element. Both valves are opened in response to pressurization of a control line that leads to the control unit, and are automatically closed whenever the control unit is unlatched and released from the valve body. The valve functions to shut-off the productioon string against upward flow of well fluids. The relatively short length of the valve body enables blind rams of the blowout preventer stack to be closed against one another at a location above the upper end of the valve body to ensure complete control of the well, and there are no exposed hydraulic connections or the like which would otherwise be subject to contamination by sea water or drilling fluids.

It also is well known to provide a "retainer" valve in the production string above the control unit. This valve, which is a normally open device, functions when closed in response to the pressure applied to a control line at the surface, to accelerate the disconnection of the control unit and valve body by suppressing the requirement to bleed of pressure in the upper production pipe. The retainer also enables pressure testing of the upper pipe for leaks prior to well testing. The retainer valve is of particular importance when testing in deep water because it can be closed to prevent pollution and dumping of high pressure gases within the riser.

The use of a separately positioned retainer valve has in the past required the presence of separate sets of hydraulic control lines for operating the master valves and the retainer valve. This requirement has resulted in complex hydraulic systems which are somewhat complicated for an operator to manipulate. Moreover, since the retainer valve has been positioned well above the control unit, a volume of well fluids and/or gases could still be dumped in the interior of the riser when the control unit is disconnected. In accordance with the present invention, the retainer valve system is an integral part of the control unit and is actuated in response to hydraulic pressures applies thereto. This construction greatly simplifies the overall arrangement of the tool and its operational sequence.

Another shortcoming of prior devices results from the fact that it is possible to trap fluids under pressure in the region between the shut-in valve and the retainer valve, which is undesirable for various reasons. One feature of the present invention lies in the provision of a bleed valve to vent pressure from this region, with the bleed valve being opened in response to a control pressure which causes release of the latch, and which opens prior to disconnection. The bleed valve cannot be opened so long as there is a control pressure being applied to maintain the shut-in valve open, and it is designed for fail-safe closure in response to well pressure. In case of hydraulic failure, the bleed valve can be opened mechanically when actuating an emergency mechanical means to disconnect the latch.

Another feature of the present invention is the provision of a ball valve element that closes fail-safe under the influence of both a spring and the pressure of a yieldable medium such as nitrogen gas. Closing also is assisted by well pressure, and the hydraulic pressure applied to a control line. The ball valve is opened, and held open, by hydraulic pressure applied to a separate control line, and is designed such that if opening pressure is lost, closure of the ball valve is provoked.

Still another feature of the new and improved subsea master valve of the present invention is the use of passages and ports within various structural members such that any fluid that leaks past a dynamic seal that is exposed to well pressure (a seal that moves relatively along another member when the tool is operated) will cause the system to assume a safe condition with the shut-in ball element closed. This feature provides additional assurance that the well will at all times be under control.

A further unique feature of the present invention is the provision of a flapper element in the valve body that is automatically pushed open when the control unit is connected, and which is held open by nitrogen and spring pressure. The flapper valve can be closed in response to hydraulic pressure applied to a control line, and will automatically close when the control unit is disconnected from the valve body.

It is the general object of the present invention to provide a new and improved subsea master valve apparatus having an integral retainer valve as well as the other unique features specified above.

SUMMARY OF THE INVENTION

This and other objects are attained in accordance with the present invention through the provision of an apparatus comprising a shut-in valve section and a hydraulically operable control unit section that are releasably connected to one another by a latch mechanism. The valve section has upper and lower valve assemblies, with the upper assembly including a normally closed flapper element and the lower assembly including a normally closed ball element. The flapper is opened by a stinger tube on the control unit that is forced downwardly through the flapper seat during connection. Both valve elements are carried on a common cage which is shifted downward within the valve body to open the ball, and upward to close the ball.

A retainer valve assembly is mounted at the upper end of the control unit, and includes a normally open valve element. This valve element, which can be either a flapper element or a ball element, is a normally open device that can be closed by remote actuation to retain production fluids in the pipe string thereabove when the releasable connection between the control unit and the shut-in valve section is released.

Hydraulically operable valve actuator systems are provided such that a hydraulic control pressure applied to one control line extending upwardly to the surface assists in the closing of the shut-in valve elements, while also closing the retainer valve element. Hydraulic pressure applied via another line functions to open the shut-in valve and the retainer valve, and hydraulic pressure applied via a third control line causes a release of the latch system that connects the control unit to the valve body section. Vent valve means is provided that is responsive to release of the latch system to bleed off any excessive pressure that may be trapped in the interior of the control unit between the shut-in valves and the retainer valve. Structure also is provided to positively prevent opening of the vent valve means so long as pressure is being applied to said other control line. The vent valve can be opened mechanically in case of an emergency, and is always opened prior to disconnection of the latch.

The ball valve element as mentioned above is a fail-closed device. In accordance with one feature of the present invention, means tending to cause closure of the ball element includes the combination of a compressed coil spring that is located in the valve body, and the pressure of a compressible fluid medium such as nitrogen gas that is contained in the control unit. Surface means also is provided on the actuator system to enable the pressure of well production fluids to cause closure of the ball. Thus if there is a failure of hydraulic control line pressure, assurance still remains that the shut-in valve will close in response to the pressures of a spring, nitrogen, and well production fluids.

Inasmuch as the control unit includes a plurality of dynamic seals, that is, seals which engage a movable surface during operation, fluid passages are provided to communicate well pressures to the surface areas upon which the first-mentioned hydraulic control pressure acts so that leakage of well fluids past a dynamic seal enables such well pressure to provoke closing of the shut-in valves of the system.

BRIEF DESCRIPTION OF THE DRAWINGS

The present invention has other objects, features and advantages which will become more clearly apparent in connection with the following detailed description of preferred embodiments, taken in conjunction with the appended drawings in which:

FIG. 3 is a top view of the valve apparatus of FIG. 2 showing connection for the various hydraulic control and other lines that extend upward to the vessel;

FIGS. 5A-5C are views similar to FIGS. 4A and 4B of another embodiment of the present invention;

FIG. 6 is a developed plan view of a pin and slot system used in actuation of valves in the embodiment shown in FIGS. 4A and 4B;

FIGS. 7 and 8 are respective side and front views of the ball valve elements employed in the embodiment illustrated in FIGS. 5A-5C; and FIG. 9 is a front view of a yoke used to actuate the ball valve of FIGS. 7 and 8.

DETAILED DESCRIPTION OF THE PREFERRED EMBODIMENTS

Figure 1:
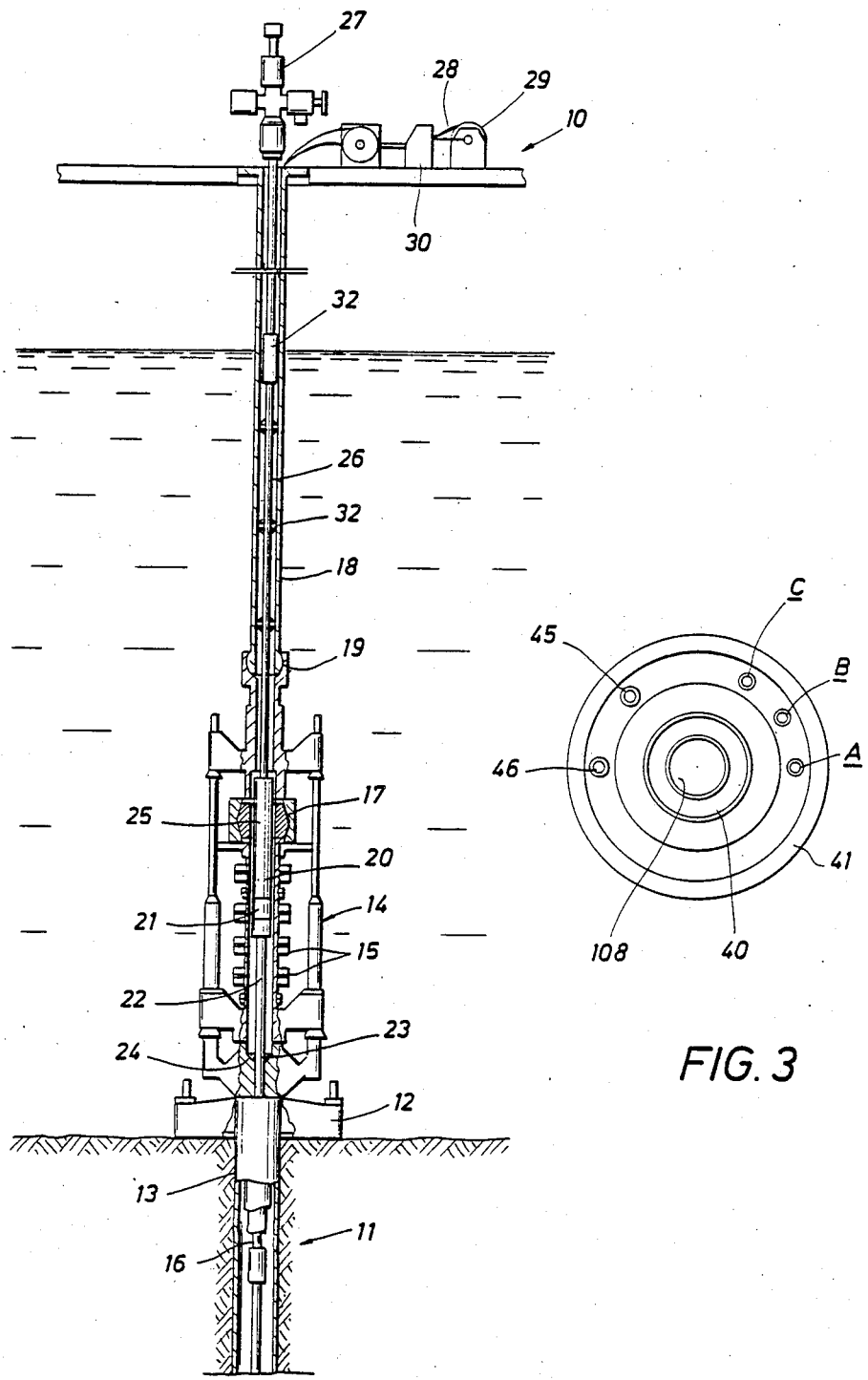
FIG. 1 is a schematic view of an offshore well installation in which a production test is being performed from a floating vessel.

Referring initially to FIG. 1, a floating drilling vessel 10 is shown stationed over an offshore well 11. A casing head assembly 12 that includes a landing base is fixed to the top of the well casing 13, and is connected in an appropriate manner to a blowout preventor stack 14. The stack 14 includes a plurality of ram-type preventers 15 having laterally movable rams that function when closed to shut off the annulus between the casing and a production string of tubing 16 that extends downwardly into the well. An annular blowout preventer 17 typically is mounted on top of the ram-type preventers 15, and a marine riser 18 is connected by a ball joint 19 to the top of the stack 14. The riser 18 extends upward to a point above the water surface where it is coupled to the vessel 10 by a tensioning system (not shown). Various hydraulic lines and the like extend from onboard control panels down to the blowout preventer stack 14 in order to enable hydraulic actuation of the various components thereof in a well known manner.

A control valve apparatus 20 that is constructed in accordance with the present invention is positioned inside the blowout preventer stack 14. The lower end of the apparatus 20 includes a shut-in valve section 21 that is connected by a slick joint 22 to a fluted hanger flange 23 which is sized to rest upon a shoulder surface 24 at the lower end of the stack 14. The rams of the lower blowout preventer can be closed against the slick joint 22, and the flange 23 provides support for the production string 16. A control unit 25 is releasably connected to the top of the valve section 21, and contains various hydraulically controlled actuators and other mechanisms to enable opening and closing the valves in the system, as well as performing other functions as will be described in greater detail below. The upper end of the control unit 25 is connected to a pipe section 26 that extends upwardly within the riser 18 to a flowhead 27 onboard the vessel 10, and a hydraulic hose bundle 28 wound on a reel 29 extends downwardly along the pipe 26 to the control unit for operating the same. A control panel 30 is provided with suitable valves and associated equipment so that an operator can control the downhole equipment as desired.

A lubricator valve 32 can be coupled into the pipe string 26 at an appropriate level in the riser to enable the upper portion of the pipe string below the flow head to be used as a lubricator chamber during wireline operations so that tools can be run in, and removed from, the tubing under pressure. Centralizers 32 and 43 can be used to center the valve and control unit assembly within the bore of the blowout preventer stack 14 in a typical manner.

Figure 2:
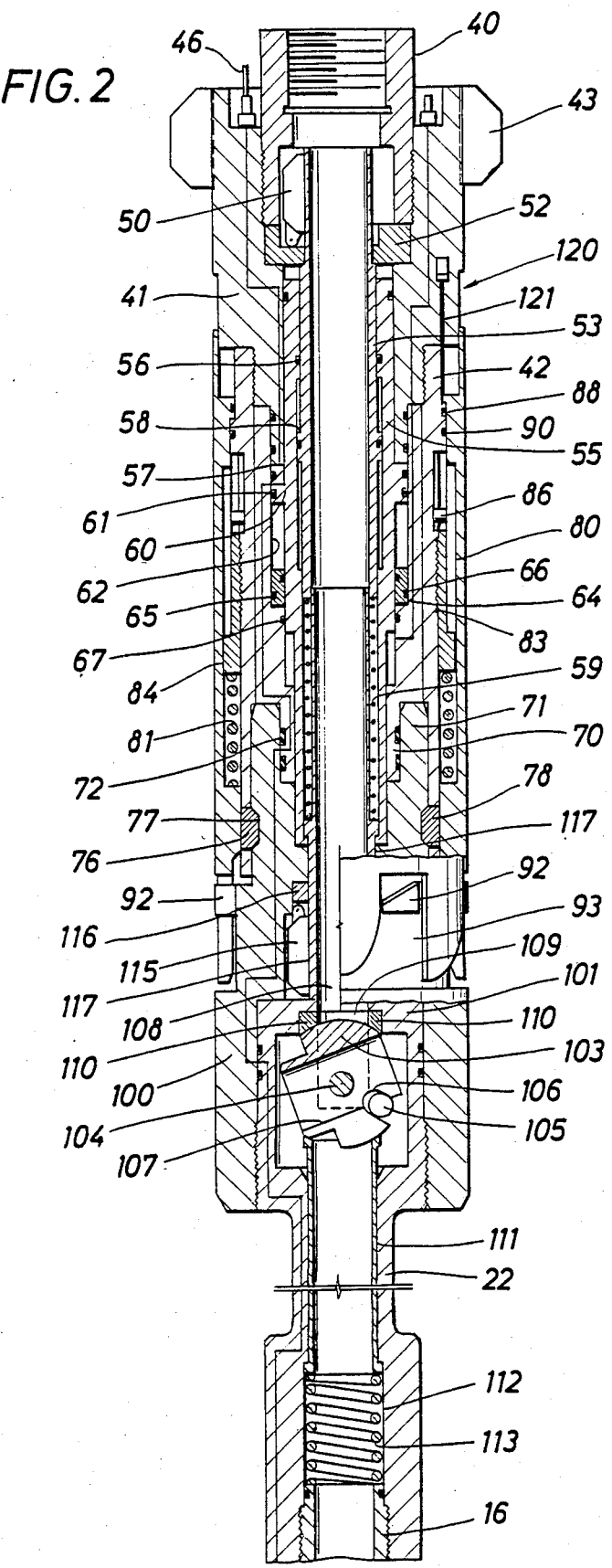
FIG. 2 is a generalized longitudinal cross-sectional view of a control valve apparatus that is constructed in accordance with the present invention.

Referring to FIG. 2, the control unit 25 includes, generally, an upper sub 40 that is threaded to an upper housing section 41, which is, in turn, threaded to a lower housing section 42. The upper housing section 41 can mount a centralizer ring 43, and a plurality of hydraulic hose connections are provided in a top surface of the section 44 as shown in FIG. 3. A total of five such connections may be provided, including a line A connection through which hydraulic fluid under pressure is fed to cause opening of the main valves mounted in the section 21, a line B connection through which hydraulic pressure is applied to assist in closing such main valves, as well as closing a retainer valve that is situated in the upper end of the control unit 25 in accordance with one feature of the present invention, and a line C connection through which hydraulic pressure is applied to cause release of a latch system that connects the control unit 25 to the valve section 21. Another line connection 45 may be provided which enables injection of a chemical, such as hydrate inhibitor, into the flow passage through the apparatus at a location within the valve section 21. Yet another line connection 46 can be provided which communicates with a passage that extends through the control unit 25, the valve section 21, the slick joint 22, and the hanger flange to a downhole point where a surface controlled, subsurface safety valve 47 is located in the production pipe string 16.

Referring again to FIG. 2, a retainer valve in the form of a flapper element 50 is hinged to a seat ring 51 and arranged to close downwardly thereagainst. The flapper element 50 may be held open by the upper portion of an actuator tube 53 that can be extended through the seat ring 52 as shown. The actuator tube 53 has a piston section 54 that is sealingly slidable within the bore of a main valve actuator mandrel 55, the piston section 54 having an upper outer diameter that is engaged by seal rings 56 and a lower, greater, outer diameter surface that carries seal rings 57. The difference in seal diameters provides an upwardly facing surface 58 on which pressure can act tending to force the tube downwardly, and a coil spring 59 biases the tube upward. Thus the flapper element 50 is a normally-open device that can be closed by applied pressure to prevent production fluids from escaping from the pipe 26 thereabove when the control unit 25 is unlatched from the valve section 21.

The actuator mendrel 55 has an enlarged diameter piston section 60 that carries seals 61 which slide against an inner cylindrical wall surface 62 of the lower housing section 42. A variable volume chamber 63 is thus provided below the piston section 60, and is arranged to contain a gaseous medium such as nitrogen under pressure. The lower end of the chamber 63 is defined by a floating ring 64 that carries inner and outer seal rings 65, 66. The housing section 42 is sealed with respect to the actuator mandrel 55 by a seal ring 67 located below the ring 64. The lower end portion 68 of the mandrel 55 extends through a reduced diameter seal section 70 of the housing member 42, with the seal section being sized to fit within the polish bore of the upper end section 71 of the valve assembly 21. A series of packing seals 72 provides a fluid-tight connection.

An outer sleeve 74 on the housing section 42 fits over the outer periphery of the valve body section 71, and has a plurality of circumferentially spaced, radially directed windows 75 which receive laterally shiftable latch dogs or keys 76. The inner profiles of the keys 76 fit into an external annular recess 77 in the body section 71, and in the latched position shown in FIG. 2, are held in their inner positions by an annular locking surface 78 on the vertically movable latch sleeve 80. The sleeve 80 is biased downward by a coil spring 81 that reacts between an upwardly facing shoulder on the sleeve and a downwardly facing shoulder on a mechanical release nut 82. The nut 82 is threaded to the housing section 42 at 83, and is splined to the release sleeve 80 at 84. Thus should the housing section 42 be rotated to the right by the pipe 26 relative to the sleeve 80, the nut 82 will be shifted upward along the housing and the sleeve. A shear pin 86 is used to couple the nut 82 to the housing section 42, so that a predetermined torque must be applied to the pipe, sufficient to shear the pin 86, before the release nut 82 can be actuated.

The latch sleeve 80 has a piston section 87 at its upper end which carries a seal ring 88 that seals against a lesser diameter outer surface 89 of the housing section 42. A greater diameter seal ring 90 is positioned therebelow, so that the annular region between the seal rings 88 and 90 can be pressurized to cause the latch sleeve 80 to shift upward against the bias afforded by the coil spring 81. When this occurs, the locking surface 78 is removed from behind the keys 76 so they can shift outward to release the control unit 25 from the valve section 21.

When the control unit 25 is engaged with the valve section 21, a series of circumferentially spaced lugs 92 engage in downwardly opening slots 93 formed in the lower end portion of the latch sleeve 80. Each slot has a helical side wall as shown to cause automatic engagement of the lugs and slots when the control unit is lowered onto the valve section 21. The engagement of the slots with the lugs prevents relative rotation of the latch sleeve 80 so that the release nut can be operated by rotating the pipe as previously described.

The valve section 21 includes a valve body 100 having a tubular cage member 101 mounted for upward and downward movement therein. The cage 101 has diametrically opposed, downwardly extending legs 102 on which a ball valve element 103 is mounted by trunnion pins 104. A transverse eccentric pin 105 that is approximately fixed to the valve body 100 engages in radially directed slots 106 in the ball element 103 so that when the cage member 101 is shifted downward, the ball is rotated to an open position where its central bore 107 is axially aligned with the flow passage 108. Upward movement of the cabe member 101 will, on the other hand, result in rotation of the ball element to its closed position where an outer spherical surface 109 thereof engages a spherical annular seat surface on a seat ring 110 carried by the cage member. The ball element 103 also is engaged by a tube 111 that is biased upwardly by a coil spring 112 that may be located within a counter bore 113 formed in the valve body 100 below the slick joint section thereof. The spring 112 tends to force the ball element 103 and the cage member 101 upwardly, to cause the ball element to close.

A flapper valve element 115 is hinged to the cage member 101 above the ball element 103, and is spring-loaded to close upwardly against a seat ring 116 that is carried by the cage. The flapper element 115 provides a redundant closure apparatus against the flow of well production fluids from the production tubing 16. The flapper element 115 is held open by a tubular "stinger" 117 that extends through the seat ring 116, and the stinger 117 is biased downwardly by the coil spring 59.

Thus the flapper element 115 also is a normally closed device to assure shut-in of the well. As will be described in greater detail below, when the control unit 25 is engaged with, and latched to, the valve section 21, the lower end portion 68 of the actuator mandrel 55 will automatically become latched to the cage member 101, so that upward and downward movement of the actuator mandrel causes corresponding longitudinal movement of the cage member.

A vent valve assembly indicated generally at 120 operates to vent excessive fluid pressures that may become trapped between the ball valve 103 and the retainer valve element 50. The pressure is vented to the interior of the riser 18 prior to release of the latch mechanism 76, and the vent valve is opened in response to the application of pressure to line C as will be described in detail below. In case of hydraulic failure, the vent valve 120 is arranged to be opened mechanically by a linkage 121 during release of the latch keys 76 through operation of the release nut 84 in response to rotation of the pipe 26.

Figure 4A:
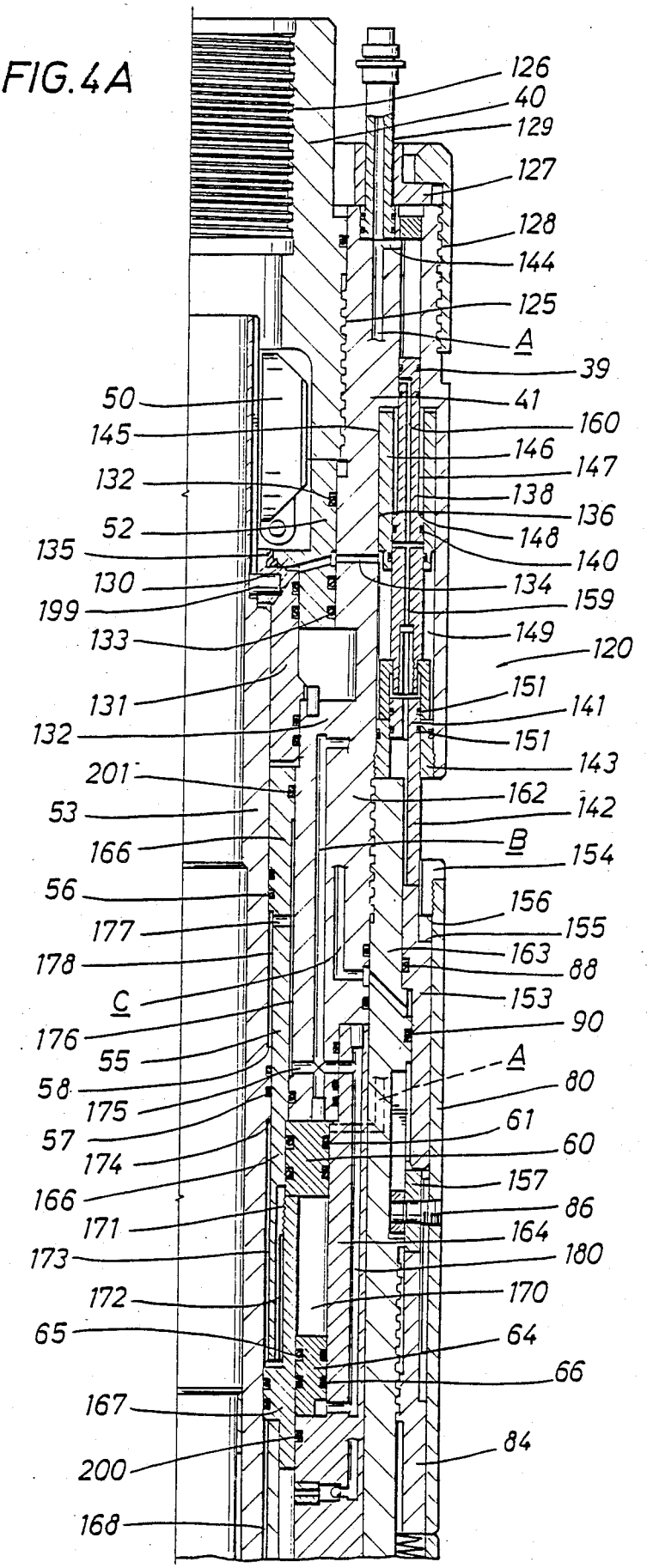
FIGS. 4A and 4B are right-side-only, longitudinal cross-sectional views of one embodiment of the present invention, FIG. 4B forming a lower continuation of FIG. 4A.
Figure 4B:
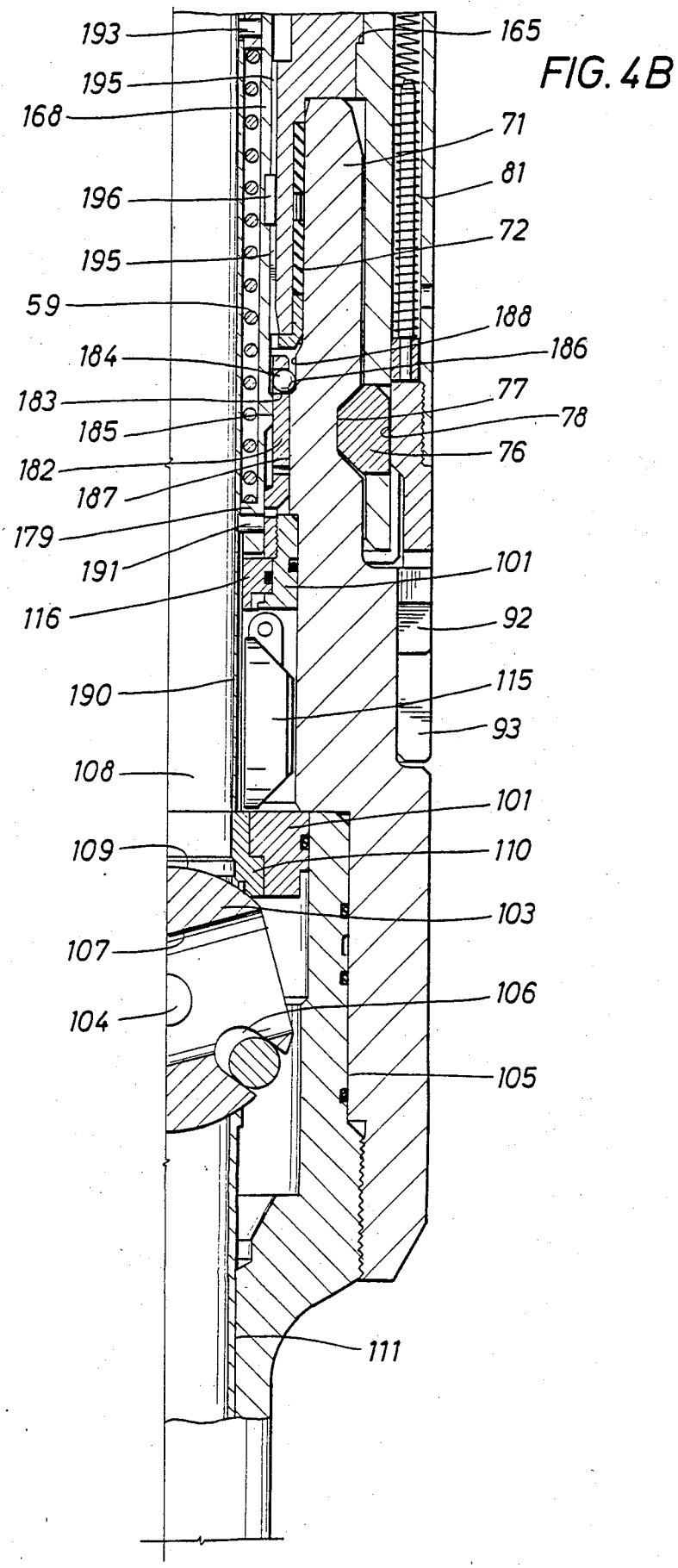

Turning now to FIGS. 4A and 4B for a more detailed illustration of one embodiment of the present invention, the same reference numbers will be used to describe parts mentioned above with respect to FIG. 2. As shown in FIG. 4A, which is a longitudinal half-sectional view (right side), the upper sub 40 of the control unit 25 is threaded at 125 into the upper end of the upper housing section 41, and has internal threads 126 to which the lower pin end of the pipe 26 is threaded. The fitting 129 for line A is sealed into a receptacle formed in the upper end of the housing section 41, and is held in place by a retainer ring 127 and a threaded cap 128. The lower end of the sub 40 abuts the seat ring 52 which has an inwardly extending flange 130 resting on top of a sleeve 131 that is supported by, and keyed to, an inwardly directed shoulder 132 on the housing section 41. The seat ring 52 carries upper and lower external seals 132, 133 that prevent leakage from a radial passage 134 that leas from an internal region below the flapper valve seal 135 to a longitudinal bore 136 formed in the housing section 41.

The bore 136 receives the vent valve assembly 120 described generally above. This assembly includes an upper differential area piston 138 carrying seals 139, 140, and a lower valve tube 141 having a push rod 142 which extends below the lower end of a bushing 143 which closes the lower end of the bore 136. The pressure of a control fluid in line A is communicated via a passage 144 to the area above the upper end of the piston 138 so that this pressure acts downwardly on the piston. The pressure of well production fluids, which exist in the central passage 108 of the control unit 225, is communicated via the radial passage 134, an annular area 145 outside of a guide sleeve 146 in which the piston 138 is fitted, and the annular area 147 inside the sleeve 146, to the upwardly facing area 148 of the piston to act downwardly thereon. Well pressure also is communicated into the annular space 149 outside of the valve tube 141 so as to act upwardly on the tube over a resultant transverse area defined by the difference in diameter of seals 140 and 151. Thus well pressure tends to shift the valve tube 141 upward, and hydraulic pressure in line A tends to shift the tube downward. Sufficient upward movement of the tube 141 will position the lower seal 151 thereon above the upper end of the bushing 143 so that pressure in the passage 134 can be vented past the push rod 142 into the annular space outside the tool. The lower end of the push rod 142 rests against the upper end of a sleeve piston 153 that is mounted inside the upper end of the latch release sleeve 80. The sleeve 153 and the cap 154 at the upper end of the sleeve 80 have axially spaced shoulders 155, 156 that permit the sleeve piston 153 to shift upward by a distance sufficient to drive the vent valve tube open prior to engagement of the shoulders 155, 156 in response to the application of hydraulic control pressure to line C. The lower end of the sleeve piston 153 is engaged by a spacer ring 157 through which the shear pin 86 extends, so that a mechanical release of the latch keys 76 in response to rotation of the pipe 26 and upward movement of the nut 84, also will drive the vent valve tube open. Thus the vent valve assembly 120 is always opened prior to disconnection of the latch mechanism by either hydraulic pressure or by mechanical means. Moreover, the well pressure within the tool biases the vent valve toward open position. The valve tube 141 and the piston 138 both have axial passages 159, 160 for pressure equalization.

As previously mentioned, a ball valve actuator mandrel 55 is sealingly slidable within the housing section 41 which can include an upper member 126, an outer member 163 and an inner member 164 that rests on a shoulder 165 on the outer member and has its upper end engaged by the lower portion of the upper member. The mandrel 55 also can be constructed with several sections threaded together, including an upper section 166, a coupling section 167 and a lower section 168. The piston member 60 can be made as a separate part and mounted on the mandrel assembly as shown in FIG. 4A. The floating separator ring 64 is located at the bottom of a variable volume chamber 170 and carries inner and outer seals 65 and 66. The chamber 170 is adapted to be charged with a suitable medium such as nitrogen gas under an initial pressure, for example, of about 2000 psi. The gas acts upwardly on the lower face of the piston 60, and also acts via a radial port 171, and passages 172, 173 on a downwardly facing surface 174 of the flapper actuator tube 53 so as to bias the same upwardly.

Hydraulic control line pressure acts via passage A on the upper face of the piston 60 so as to force it and the actuator mandrel assembly downward within the housing section 164. Such pressure also acts via channels 175, 176, 177 and 178 on the upper surface 58 of the flapper tube 53 in order to exert downward force thereon. The tube 53 is biased upwardly by a coil spring 59 as shown in FIG. 4B, the spring reacting between an inwardly extending flange 179 on the lower end of the actuator mandrel section 168 and the lower end surface of the tube 53.

Control pressure applied to line B acts through passage 180 on the lower face of the floating piston 64 and thus increases the pressure of nitrogen in the chamber 170. This pressure exerts upward force on the actuator piston 60 and the mandrel assembly 55 which is releasably latched to the cage member 101 in a manner that now will be described.

As shown in FIG. 4B, a latch sleeve 182 is threaded to the upper end of the cage member 101. The sleeve 182 has a plurality of circumferentially spaced holes 183 arranged in a horizontal plane near the upper end thereof, with a ball 184 being received in each hole. The lower end portion of the mandrel section 168 has an enlargement 185 formed thereon, which is located above the lower end of the section by a distance such that it is below the level of the balls 184 when such lower end engages the flapper seat ring 110. The diameter of each ball 184 is larger than the wall thickness of the sleeve 182, so that when the cage member 101 is pushed downward, an inclined surface 186 on the body 100 cams the balls inward above the enlargement 185 in order to lock the mandrel to the cage. So long as the cage 101 is in a lower position, an inner wall surface 187 holds the balls 184 inward. Thus the cage 101 must move downward with the actuator mandrel due to engagement of its lower end with the seat ring 110, and the cage is pulled upward with the mandrel by engagement of the enlargement 185 with the balls 184. When the balls 184 arrive at the location shown in FIG. 4B, they can shift outward into the recess 188 above the shoulder 186 in order to release the actuator mandrel from the cage.

A stinger tube 190 for pushing the flapper valve 115 open may be coupled to the lower section 168 of the actuator mandrel 55 by opposed pins 191 that extend into longitudinal slots 192 in the wall of the tube 190 as shown in developed plan view in FIG. 6. Additional pins 193 on the lower end of the upper stinger tube 53 also extend into inclined slots 194 on the upper portion of the lower tube 190. The slots 192 and 194 are arranged such that downward movement of the mandrel section 168 relative to the tube 190 will cause the tube to rotate, the mandrel section 168 being keyed at 196 to a spline groove 195 in the housing section. Rotation of the tube 190 causes corresponding rotation of the upper stinger tube 53, whereby inclined slots 197 on the upper portion 198 thereof that are engaged by pins 199 on the sleeve 131 cause upward movement of the tube and opening of the flapper element 50 as shown in FIG. 4A. Thus both flapper elements 50 and 190 are opened mechanically as the control unit 25 is latched to the valve body 21.

The ball valve 103 and its mode of actuation have been previously described with respect to FIG. 2. Although not shown in detail in the drawings, the hanger flange 23 (FIG. 1) may be threaded to the pipe step below the stick joint 22 so as to be adjustable therealong. A suitable key may be used to lock the hanger flange 23 in a selected position.

In operation, a production or drill stem testing tool is lowered into the well 11 on the pipe string 16 to test depth minus water depth. The subsea control valve apparatus of the present invention is then installed in the pipe string, and the hydraulic control lines A, B and C are connected to the upper end of the control unit 25, along with the chemical injection line and the safety valve control line. The apparatus when is lowered through the riser 18 until the assembly is landed in the blowout preventer stack 14, with the hanger flange 23 resting on the shoulder 24. The various parts and subassemblies are in the relative positions shown in FIGS. 4A and 4B, with the cage member 101 in its upper position so that the ball valve 103 is closed. The lower stinger tube 190 is extended through the seat ring 116 so that the flapper element 115 is open, and the upper stinger tube 53 is in its upper position holding the retainer valve flapper 50 open. After the apparatus is landed, the lower ones of the pipe rams are closed around the slick joint 22 to seal off the annulus between the pipe 16 an the innermost string of casing 13.

To open the valve 103 so that the well can produce, the line A is pressurized from the onboard control panel 30. The hydraulic pressure from line A acts downward on the upper face of the piston 60, forcing it and the mandrel assembly 53 downward against the bias of the nitrogen gas in the chamber 170, and the coil spring 112. Downward movement of the mandrel assembly 55 causes corresponding downward movement of the cage member 101 and rotation of the ball element 103 to open position. The latch balls 184 are shifted inwardly above the enlargement 185 so that the actuator and cage are connected together. The ball valve 103 remains open so long as pressure is applied to line A so that the well can produce fluids. The retainer valve element 50, which is a normally open device, remains open as described as the well is produced.

To close the ball valve 103, the pressure in line A is bled off. The combination of the pressure of the nitrogen gas in the chamber 170, and the bias of the coil spring 112, forces the cage member 101 upward to rotate the ball closed. The upward force due to nitrogen pressure is designed to be sufficient to ensure cutting of a 15/32" logging cable should a wireline tool be in the well, and an emergency shut-in is desired. The ball valve 103 has the lower portion thereof cut away to provide for the shearing and cutting in two of any one inch coil tubing that may be disposed in the well.

To assist in closing the ball valve 103, in the event further assistance is needed, pressure can be applied to line B. Such pressure enters below the floating piston 64 via channel 180, and increases the pressure of the nitrogen in chamber 170 to correspondingly increase the upward force on the piston 60 and the mandrel assembly 55. Of course the increased force results in increased torque being applied to the ball element 103 by the eccentric pin 105. The pressure in line B also passes through the channels 175, 176, 177 and 178 and acts downward on the surface 58 of the upper stinger tube 53. The tube 53 is caused to shift downward against the bias afforded by the coil spring 59 to enable the flapper element 50 to be pivoted closed by its hinge spring. The pressure of the nitrogen in the chamber 170 also will act via the passages 171, 172, and 173 on the surface 174. However, the surface 174 has substantially the same transverse cross-sectional area as the surface 58, so that force due to applied pressure in line B are balanced with respect to the tube 53. Well pressure in the central passage 108 through the tool acts upwardly on the actuator mandrel 53 via an area defined in part by a seal ring 200 on the housing section 164, and downwardly thereon over an area defined in part by the seal ring 201 at the upper end of the mandrel assembly. Since these seal rings engage on substantially the same diameters, the mandrel assembly 53 is substantially balanced with respect to well pressures.

The redundant valve system provided by the flapper element 115 will remain open as shown as long as the control unit 25 is latched to the valve section 21. However when the control unit 25 is unlatched and disconnected from the valve body 100, the lower stinger tube 190 will be withdrawn through the seat ring 116 to enable the flapper to be closed by its hinge spring. When closed the flapper element will shut off upward flow, even though the ball element 103 might be stuck in its open or partially open position.

Unlatching and disconnection of the contrl unit is accomplished by pressurizing line C. Such pressure acts upwardly on the difference in areas circumscribed by the rings 88 and 90 that seal the sleeve piston 153, thereby causing it to move upwardly. The initial upward movement of the sleeve 153 pushes the vent valve tube 141 upward to disengage its seal 181 from the bushing 143 and allow any excessive pressure trapped between the ball valve 103 and the retainer flapper 50 to be vented to the annulus outside the control unit 25. Additional upward movement of the sleeve piston 153 lifts the latch sleeve 80 upward to remove the locking surfaces 78 from behind the latch keys 76. When the surfaces 78 have cleared the keys 76, they are free to shift outwardly in the windows to released position with respect to the valve body groove 77. Upward force of the latch sleeve 80 overcomes the bias of the spring assemblies 81 which continuously urge the sleeve downwardly. With the keys 76 released, the control unit 25 can be pulled upwardly by the pipe string 26, causing the housing seals 72 to be withdrawn from the bore of the upper body section 71. As the control unit 25 is lifted, the lower stinger tube 190 is pulled out of the flapper seat ring 116 to allow the flapper to close upwardly against its seat. With the control unit 25 removed, the valve section 21 is of such short length that the blind rams of the upper ram-type preventer can be closed against one another to ensure complete control of the well.

To prevent dumping of well fluids in the pipe string 26 into the riser 18, line B can be pressurized to cause downward shifting of the upper stinger tube 53 as previously described. The retainer valve accelerates the disconnection procedure for the control unit 25 by suppressing or eliminating the requirement to bleed off pressure in the pipe string 26 prior to disconnection. The retainer flapper 50 also can be closed to enable pressure-testing the entire upper pipe string 26 prior to initiating a production or drill stem test.

In case it should become necessary to effect a mechanical release of the control unit 25, the pipe 26 can be rotated at the surface to cause corresponding rotation of the housing section 42. When the shear ring 86 is disrupted in response to a predetermined torque, continued rotation causes the nut 84 to lift the latch sleeve 80 upward to the release position. Prior to actual upward movement of the sleeve 80, the vent valve tube 141 will have been pushed open to vent pressures between the flapper valve 50 and the ball valve 103.

To reconnect the control unit 25, a procedure similar to the disconnection procedure outlined above is used. The control unit 25 is lowered through the riser with the line C under pressure to hold the latch sleeve 80 in the upper position. When the keys 76 encounter the outer inclined surface on the upper section of the valve body 100, the keys are cammed outwardly and positioned opposite the body recess 77. Thus as the pressure in line C is bled off, the springs 81 shift the latch sleeve 80 downwardly to its position where the keys 76 are locked within the body recess 77. The reconnection procedure also causes the lower stinger tube 190 to push the flapper 115 open, and the retainer flapper remains in its normally open position until such time as pressure is applied to line B.

Figure 5A:
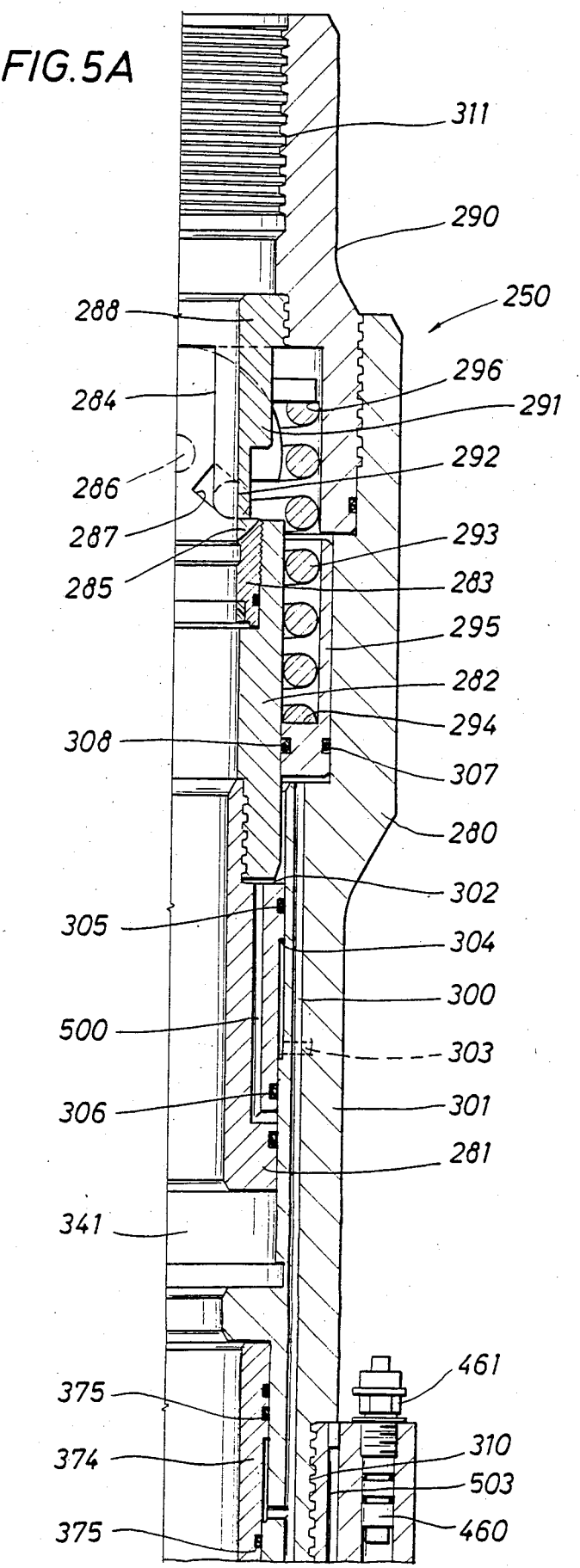
Figure 5B:
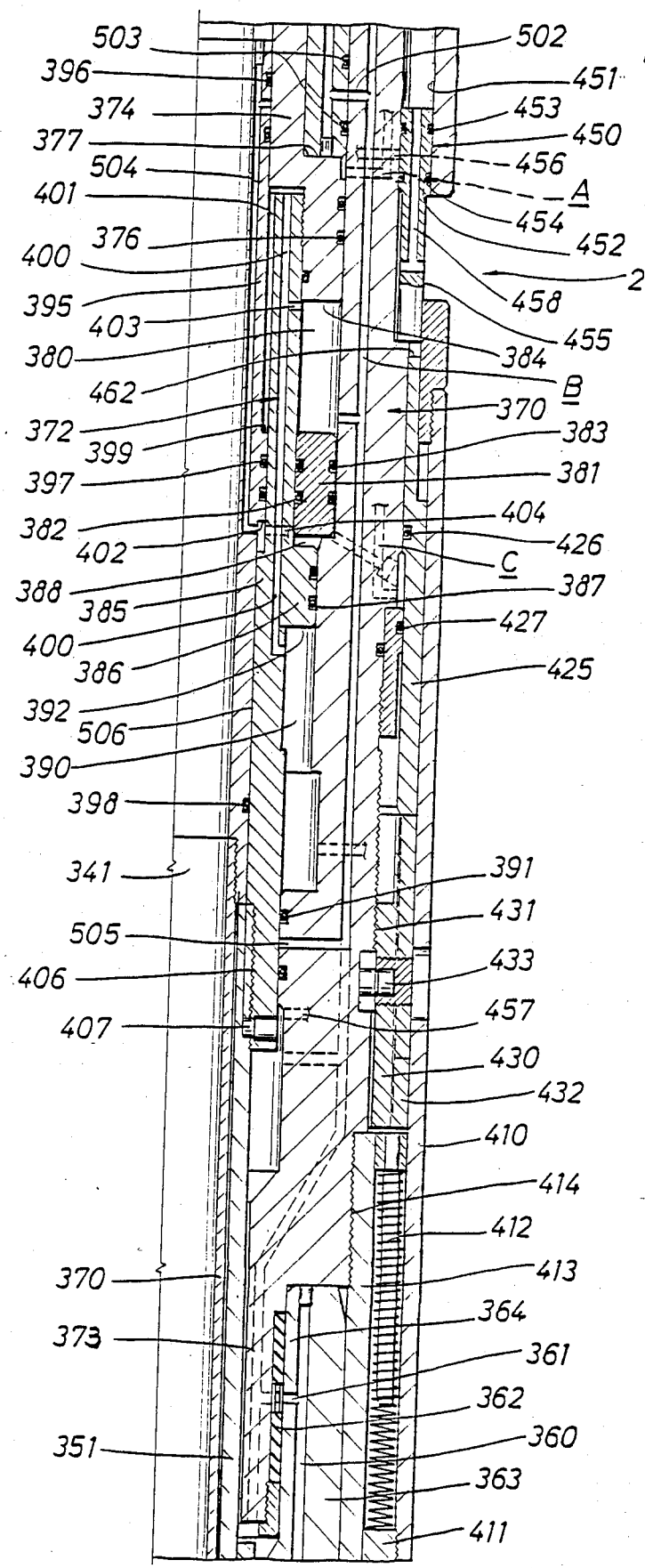

Another embodiment of the present invention is illustrated in FIGS. 5A–5C. This embodiment is generally similar to the previously described embodiment in overall arrangement, but has other unique features as will be described herein. The valve system includes a retainer valve assembly 250, a hydraulically operable valve actuator assembly 255 and a well shut-in valve assembly 260 that is releasably connected to the actuator assembly. The actuators for the retainer valve and the redundant valve element in the shut-in section are not mechanically connected as in the case of the previous embodiment, so that when line B is pressurized the redundant valve element in the shut-in section closes, and the last valve element to close in the operating sequence is the retainer valve element. In this manner, malfunction of one valve closure system or any component thereof does not affect the operation of the other valve closure system.

As shown in FIG. 5A, the retainer valve body 280 has a sleeve piston 281 slidably disposed in the lower portion thereof. The sleeve piston 281 is connected to a generally tubular valve cage member 282 which carries a set ring 283 and two oppositely disposed, upwardly extending arms 284 on the upper end thereof. A ball valve element 285 is mounted for pivotal rotation on the arms by means of trunnion pins 286, and has radially directed slots 287 through the side walls thereof. A yoke 288 that is threaded to the upper sub 290 has a downwardly extending leg 291 with oppositely extending eccentrics 292 on its lower end which engage the respective slots 287, so that upward movement of the ball valve element relative to the yoke causes the ball to rotate in one direction, and downward relative movement causes rotation in the opposite direction. A coil spring 293 which reacts between an upwardly facing shoulder 294 on a seal sleeve 295, and downwardly facing shoulders 296 on oppositely directed flanges 297 (shown 90° out of position for ease of illustration) which are formed on the upper ends of the cage arms 284, forces the cage member 282 upwardly within the valve body 280 to normally maintain the ball valve in its open position as shown in FIG. 5A.

A pressure channel 300 that extends upwardly within the lower section 301 of the body 280 has its upper end in communication with an upwardly facing surface 302 on the sleeve piston 281, so that hydraulic control pressure that is applied to this channel produces downwardly directed force to the sleeve piston, causing it and the cage member 282 to shift downward against the bias afforded by the coil spring 293. The channel 300 is in communication with line B as in the previously described embodiment. This motion closes the ball 285 so that its spherical outer surface engages the seat ring 283. A second pressure channel 303 which also extends upwardly in the lower portion 301 of the body 280 (and is circumferentially offset from the other channel) feeds applied pressure to a downwardly facing surface 304 which causes the sleeve piston 281 and the cage member 282 to be forced upwardly. The channel 302 is connected to line A as in the previously described embodiment. Such upward movement, which is aided by the force of the coil spring 293, causes the ball valve 285 to open. Thus it will be apparent the ball valve element 285 which constitutes a retainer valve is normally open under the influence of the coil spring, that the valve can be held open with pressure applied to line A, and that the valve is closed in response to the application of pressure line B.

Seal rings 305 and 306 engage on different internal diameters of the body section 301, as shown, to provide the piston effect. The seal valve 295 also carries seal rings 307 and 308 which prevent leakage of control line fluid from the upper end of channel 300. The lower end portion 301 of the retainer body 280 is threaded at 310 into the upper end portion 311 of the hydraulically operable actuator section 255, and the upper sub 290 has threads 311 for connection to the lower end of the section of production pipe 26 that extends upwardly to the vessel 10.

Turning now to FIG. 5C, the shut-in valve section 260 includes a generally tubular valve body 320 having a latch section 321 at its upper end. A valve cage member 322 is slidably disposed within the valve body 320, and has an upper portion 323 which carries a seat ring 324 and a flapper valve element 325. The lower portion of the cage 322 carries another seat ring 326 and has diametrically opposed, downwardly extending arms 327 on which a ball valve element 328 is mounted by trunnion pins 329. A suitable window is formed in the side of the cage 322 below the upper seat ring 324 to receive the flapper element 325 in its open position as shown in the drawing. A coil spring 320 reacts between a shoulder 331 on the body 320 and a shoulder 332 on the lower portion on the cage member 332, and tends to force the cage upwardly within the valve body.

A yoke 335 is threaded to the lower end portion 336 of the valve body 320, and as shown in FIG. 9 has an upstanding leg 337 with oppositely extending eccentrics 338 that engage in radially directed slots 339 in opposite side walls of the ball valve element 328 which is shown in further detail in FIGS. 7 and 8. Thus downward movement of the cage member 332 within the body 320 will cause the ball element 328 to rotate to its open position where the bore 340 thereof is axially aligned with the flow passage 341 through the valve body, whereas upward movement of the cage member will cause the ball element to rotate to closed position where its spherical outer surface 342 engages the seat ring 326. As shown in FIG. 8, the ball element 338 is opened on the side thereof opposite the surface 342 to facilitate the cutting of wireline or coil tubing as will be apparent to those skilled in the art.

A latch tube 345 is threaded into the upper end portion 323 of the cage member 322, and has circumferentially spaced windows 346 that received laterally movable latch dogs or keys 347. The lower end of the latch tube 345 retains the flapper seat ring 342 on the cage member 323. An external annular latch recess 350 is formed on the outside on the lower end portion 351 of a latch tube 352, the recess being shaped to receive the inner portions of the keys 347. The lower end surface of the tube 352 is arranged to abut against the seat ring 324 in order to drive the cage member 322 downward. When this occurs, the keys 348 are locked in engagement with the recess 350 by an inner surface 353 so that subsequent upward movement of the latch tube 352 will function to pull the cage member 322 upwardly.

An internal pressure channel 360 extends substantially throughout the length of the valve body 320 so that the chemicals can be injected into the production string below the valve assembly to inhibit the formation of hydrates (ice) that might block valve operation, or to provide a fluid pressure channel for the remote control of a surface controlled, subsurface safety valve that is located in the production string downhole. The upper end of the channel 360 terminates in a radial port 361 which enters the seal bore 362 of the upper portion 363 of the body at a location that is straddled by the seal packing 364 on the lower end of the actuator section 255.

The flapper valve 325, which tends to close against the seat ring 324 due to the action of a hinge spring 365, is arranged to be pushed open by inserting through the seat ring a tubular "stinger" 370 that pivots and then holds the flapper element open. The ball valve element 328, which also is a normally closed device, is opened by shifting the cage member 322 downwardly within the body 320, against the bias afforded by the coil spring 320, so that the eccentrics 338 on the yoke 337 cause the ball 328 to pivot in a counter clockwise direction about the pins 329 to bring its central opening into vertical alignment with the flow passage of the valve body 320.

The hydraulically operable valve actuator section 255, which is connected directly to the lower end portion 301 of the retainer valve body 280, includes an elongated tubular housing assembly 370 having a reduced diameter seal section 371 at its lower end as shown in FIG. 5B. The flapper valve actuator tube or "stinger" 373 is slidably mounted within the housing 370, and a ball valve actuator mandrel 372 is slidably mounted in the housing assembly externally of the actuator 373.

The ball valve actuator mandrel comprises an upper piston section 374 that carries seal ring 375 on a lesser outer diameter thereof, and additional seal rings 376 on a greater outer diameter thereof. A pressure channel A leads to an annular chamber 377 whose inner and outer diameters are defined by the seal surfaces of the housing engaged by the seal rings 375 and 376, so that hydraulic fluid pressure applied to channel A forces the actuator mandrel 372 downward within the housing 370.

An annular channel 380 in the housing 370 below the piston section 374 has its lower end closed by a floating piston ring 381 that carries inner and outer seals 382 and 383, and the chamber is communicated with a channel B by a radial port as shown, so line B pressure acts on the lower face 384 of the section 374. The central section 385 of the actuator mandrel 372 has an outwardly directed flange 386 that carries seals 387 which engage an inner wall surface of the housing 370 on a lesser diameter than that engaged by the seals 376. The annular space 388 between the floating ring 381 and the flange 386 is adapted to contain air at atmospheric or other low pressure. A third annular chamber 390 located below the flange 386 has its lower end closed by seals 391 which engage on a lesser diameter of the mandrel section 385 than the flange seals 387. The chamber 390 is adapted to contain a compressible medium such as nitrogen gas under pressure which exerts upward force on the lower face 392 of the flange 386.

The upper section 395 of the "stinger" tube 370 has three sets of seal rings 396, 397 398, with the upper seals 396 engaging the piston section 374, and the middle and lower seals 397, 398 engaging the intermediate section 385 of the actuator mandrel 372. The middle seals 397 engage on a greater inner diameter of the actuator mandrel than the upper seals 396 to provide a resultant, upwardly facing surface 399 on the stinger tube that is subject to the pressure of nitrogen via passages 400 and 401. The middle seals 397 also engages on a greater diameter than the lower seals to provide a resultant, downwardly facing surface 402 on the stinger tube that is subject to the pressure of line B via ports 403 and 404 and a longitudinal channel (not shown). Thus the stinger tube is biased downward by nitrogen pressure, and can be forced upwardly through application of hydraulic control pressure to line B. The lower section 351 of the actuator mandrel 372 may be formed as a separate sleeve, as shown, which is threaded to the section 385 at 406, with the thread being locked by a pin 407.

In order to provide a releasable latch connection between the control unit 255 and the shut-in valve section 260, a latch sleeve 410 is slidably mounted on the outside on the housing 370, and has a locking sleeve 411 threaded to its lower end as shown in FIG. 5C. The locking and latch sleeves 411 and 410 are biased downwardly by a plurality of spring assemblies 412 that are mounted in axial bores on a dog sleeve 413 that has its upper end threaded to the housing at 414. The dog sleeve 413 has a plurality of windows 415 near its lower end which receive laterally shiftable dogs or keys 416. The keys 416 can engage in the annular recess 417 on the upper section 321 of the valve body 320, and are held inwardly in locked positions by an inner locking surface 418 on the locking sleeve 411. When the locking sleeve 411 is moved upward relative to the dog sleeve 413, an enlarged inner diameter 414 of the sleeve is positioned behind the keys 416 to enable them to move outward and release from the recess 417.

In order to actuate the latch sleeve 410, a sleeve piston 425 is slidably mounted on the housing 370 inside the upper end portion of the latch sleeve. Pressure applied to the differential area of the sleeve piston 425 defined by upper and lower seal rings 426, 427 via channel C in the housing causes the sleeve piston the shift upward, and, after engagement with cup 428 at the upper end thereof to drive the latch sleeve upward to it key-release position. When pressure in line C is relieved, the spring assemblies 412 force the latch sleeve 410 downward to its key-locked position. As a redundant or back-up means to release the keys 416, a clutch nut 430 that is threaded to the housing 370 by large acme-type threads 421 is provided. The nut 430 is splined to the latch sleeve at 432, and normally is held against rotation with respect to the housing 370 by a shear pin 433. If hydraulic control line pressure fails to release the latch keys 416 as described above, the entire housing 370 of the control unit 255 can be rotated to the right by turning the production pipe 26 at the vessel 10. The latch sleeve 410 is held against rotation due to engagement of downwardly opening slots 435 in the lower end of the locking sleeve 441 with outwardly projecting lugs 436 on the shut-in valve body 320. Applied torque causes the pin 433 to be sheared. Additional rotation then causes the nut 430 to feed upwardly along the housing 370, thereby driving the sleeve piston 425 and the latch sleeve 410 upwardly until the keys 416 are released.

In order to ensure that excessive pressure is not trapped within the tool between the shut-in valve unit 260 and the control unit 255, a vent valve assembly 450 is provided as shown at the top of FIG. 5B and the bottom of FIG. 5A. A bore 451 formed in an upper outer portion of the housing 370 receives a vent valve tube 452 which carries upper and lower seal rings 453, 454, and has a push rod section 455 at its lower end. The seals 453, 454 normally span a radial vent port 456 which communicates with the flow passage 341 of the tool via a lengthy vertical port (not shown) in the housing 370 and a lower port 457 therein. The tube 452 has a central port 458 to equalize fluid pressure thereacross. A compensator piston 460 is movable in the top of the bore, and functions to separate line A pressures, which enter the housing at connection 461, from riser fluids which are present in the bore 451 below the piston.

Normally, the vent valve tube 452 occupies the position shown in FIG. 5B with its push rod 455 resting against a shoulder 462 on the housing 370. In this position the seals 453 and 454 close off the vent port 456, and in response to line A pressure, the compensator piston 460 shifts downward and positively holds the vent value tube closed. However when the sleeve piston 425 is shifted upward in response to pressure in line C, the upper end surface 462 of the piston pushes the valve tube upward until its lower seal 454 clears the vent port 456, which occurs prior to engagement of the piston with the latch sleeve cap. Thus internal pressure is always vented to the riser annulus prior to unlatching to the control unit from the shut-in valve unit.

Another unique feature of the present invention is the provision of fluid passages in various components of the tool which ensure that should a dynamic seal that is exposed to well fluid pressure leak for any reason, the well pressure is channeled into line B to provoke closing of the valve. As shown in FIG. 5A, for example, a pressure channel in the form of a longitudinal port 500 leads from the region of the surface 302 to a radial port 501 that opens to the outside of the sleeve piston 281 at a location between the seal rings 306. Should the lower one of the seals 306, which is a dynamic seal that is exposed to well pressure in the flow passage 341, leak or otherwise fail to hold pressure, such well pressure will enter the port 501 and pressurize the channel 300. The channel 300 is connected to line B by virtue of radial ports 502 that extend between seals 503 (FIG. 5B). Another dynamic seal subject to well pressure is the upper one of the seals 375 at the upper end of the actuator mandrel 372. Should this seal leak, well pressure would then pass through port 503 and into channel 300 which is connected to line B. A similar structure is present in connection with the upper seal 396 on the stinger tube section 395. Should this seal leak, well pressure will be fed to a longitudinal port 504 that has its lower end placed in communication with channel B. A radial port 505 is provided to feed well pressure to line B in the event the lower one of the seals 392 should leak. Finally, if the seal 398 on the tube section 395 should leak, well pressure can pass through the clearance space 506 and be communicated with line B in the same manner as port 504.

Various ones of the vertical, radial and other ports and passages are shown in phantom lines in the drawings for convenience of illustration, of course it will be apparent that these passages are not located in the plane of the cross-section shown in the drawings, but rather are circumferentially spaced from such plane.

The overall operation of the embodiment shown in FIGS. 5A-5C is essentially similar to that described with respect to the previous embodiment, and thus will not be repeated in detail. Such operation may be summarized as follows. The application of hydraulic fluid control pressure to line A produces these functions:
1. the well shut-in ball valve 328 is opened; and
2. the compensation piston 460 is forced down against the vent tube 452 to insure closure of vent port 456.

Application of pressure to line B performs the following operations:
1. the retainer valve 285 is closed;
2. the shut-in ball valve 328 is assisted in closing.

When control line C is pressurized, the following operations occur:
1. the vent valve 452 is opened to vent interior pressure, after which
2. the latch dogs 416 are released to unlatch the control unit and shut-in valve unit.

It now will be recognized that a new and improved subsea test valve apparatus have been provided that includes the various features and improvements identified herein. Since certain changes or modifications may be made by those skilled in the art without departing from the inventive concepts involved, it is the aim of the appended claims to cover all such changes and modifications falling within the true spirit and scope of the present invention.

What is claimed is:

1. Apparatus adapted to be landed in a subsea wellhead and used to control the flow of fluids therefrom, comprising a relatively short length valve body having a flow passage; first, normally closed valve means for opening and closing said flow passage; a control valve unit having a flow passage and being adapted to be connected to a pipe string extending upwardly to the surface; remotely operable means for releasably connecting said control unit to said valve body; and second, normally open valve means in said control unit for retaining fluids in said pipe string when said connecting means is released; further including means responsive to the application of a hydraulic control pressure to an interior region of said control unit for releasing said connecting means; and vent passage and valve means that are opened in response to the application of said hydraulic control pressure for bleeding any excessive pressure between said first and second valve means to the exterior of said control unit prior to release of said connecting means.

2. The apparatus of claim 1 further including means for preventing opening of said vent passage and valve means so long as said first valve means is open.

3. The apparatus of claim 2 further including passage means for transmitting well pressure to cause closing of said vent passage and valve means in the event of leakage of a seal ring that is exposed to well pressure.

4. The apparatus of claim 1 further including axial cam means responsive to rotation of said pipe string with respect to said valve body for releasing said connecting means, and means responsive to operation of said axial cam means for driving said vent valve means to its open position.

5. The apparatus of claim 4 further including shear means for preventing operation of said axial cam means until a torque of a predetermined magnitude has been applied to said pipe string.

6. A ball valve apparatus, comprising a valve body having a flow passage; cage means movable longitudinally in said body between spaced positions; a ball valve element mounted on said cage means for rotation about an axis that is transverse to said flow passage; seat means on said cage means surrounding said flow passage and having a spherical annular seat surface; said valve element having a spherical outer surface engageable with said seat surface to close said flow passage and an open bore adapted to be aligned with said flow passage, the side of said element opposite said spherical outer surface providing an opening into said bore; and yoke means on said valve body having a leg extending into said opening and having eccentric means engageable with surface means on said ball element to rotate the same open in one position of said cage means within said body and to rotate the same closed in another position of said cage means within said body; including another seat ring on said cage member surrounding said flow passage, and a flapper valve element pivoted to said cage means and adapted to swing from an open position to the side of said flow passage and engaging said another seat ring.

7. The apparatus of claim 6 further including a latch sleeve connected to said cage means and having means thereon for releasably connecting an actuator means thereto.

8. The apparatus of claim 7 further including detent means on said valve body for releasably connecting an associated apparatus thereto.

9. A method for use in the production testing of a well using a control unit releasably connected to a valve unit landed in a subsea wellhead, said valve unit having a normally closed shut-in valve, and said control unit having a normally open retainer valve, comprising the steps of: opening said shut-in valve to allow the well to produce; closing said shut-in valve and said retainer valve; venting pressure in the interior of said control unit between said shut-in valve and said retainer valve to the annulus; and then releasing said control unit from said valve unit to enable said control unit to be removed from said wellhead.

* * * * *